March 20, 1945.　　　　J. HOJNOWSKI　　　　2,371,994
BOMB RACK
Filed March 3, 1942　　　　5 Sheets-Sheet 1

Inventor
Jakob Hojnowski
By Bryant K Lowry
Attorneys

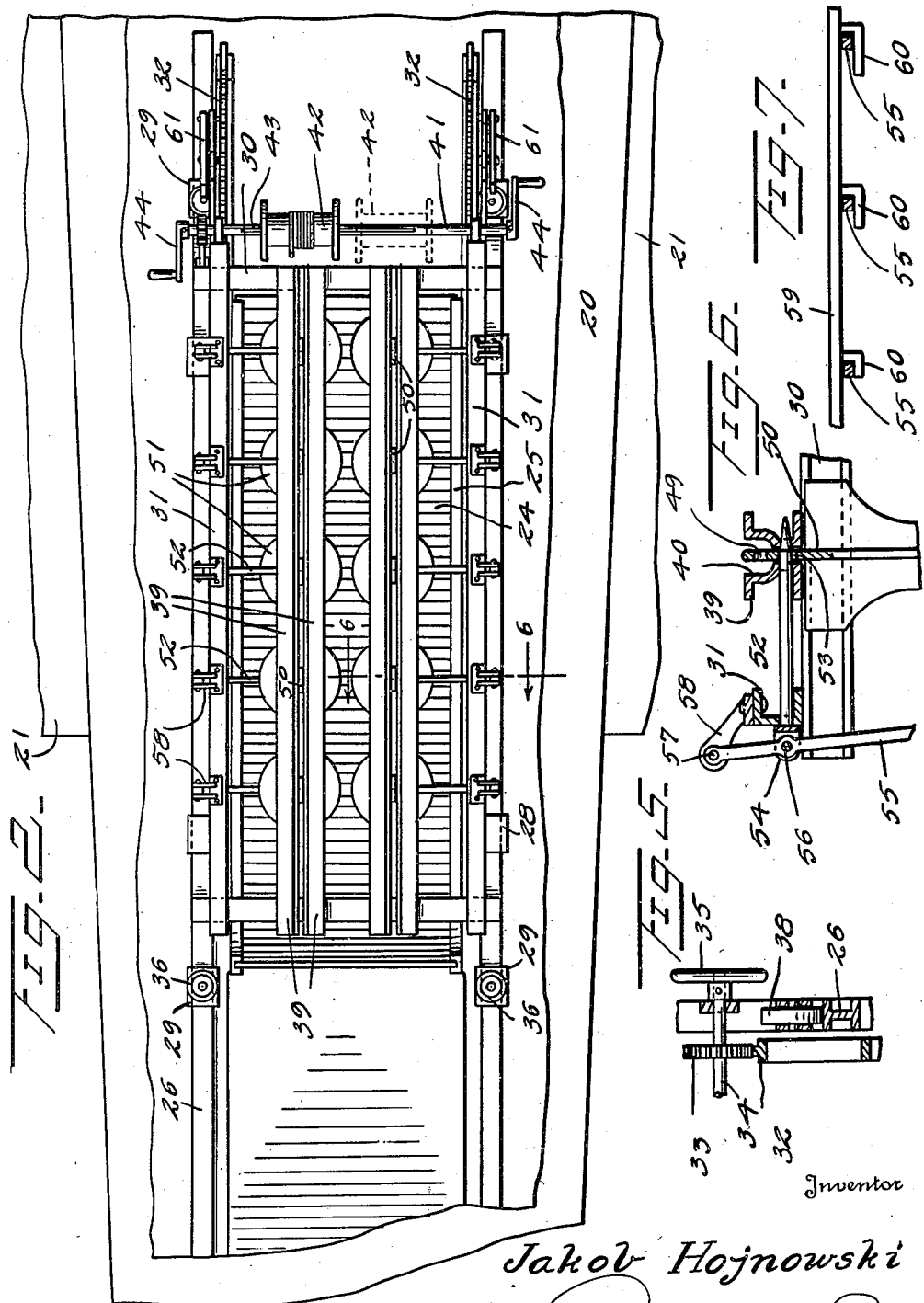

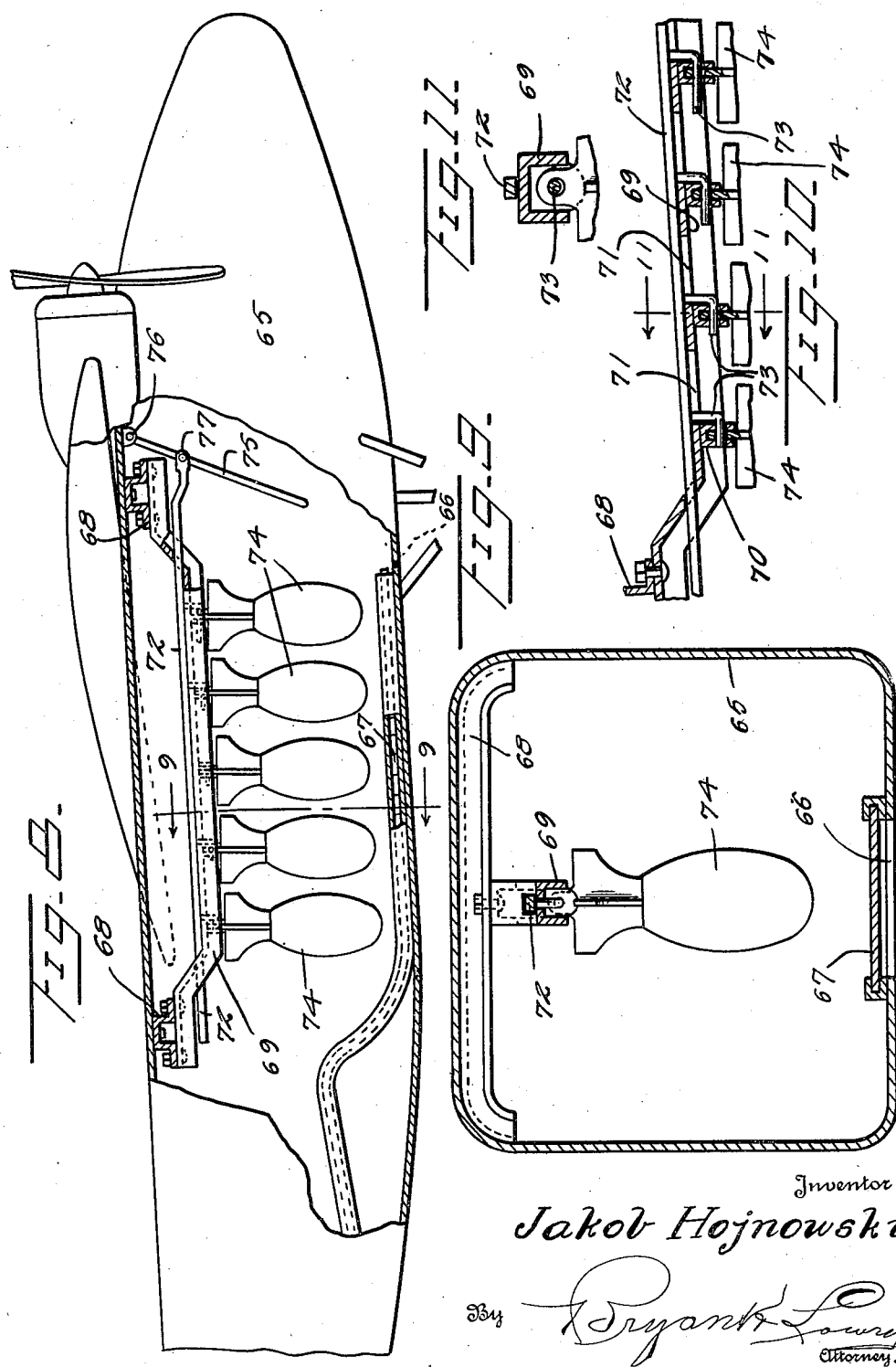

March 20, 1945.  J. HOJNOWSKI  2,371,994
BOMB RACK
Filed March 3, 1942  5 Sheets-Sheet 4
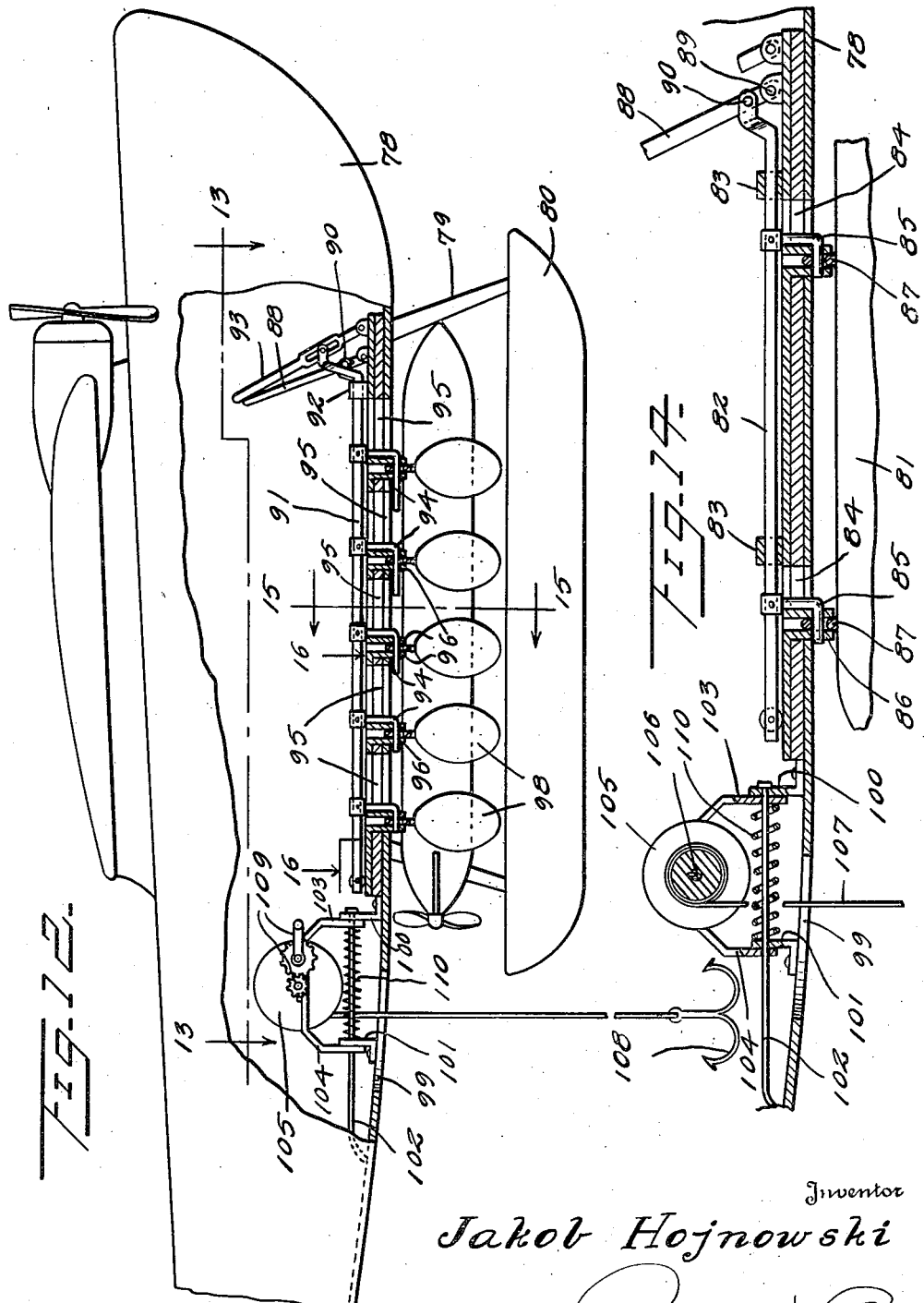
Inventor
Jakob Hojnowski
By Bryant H Lowrey
Attorneys March 20, 1945. J. HOJNOWSKI 2,371,994
BOMB RACK
Filed March 3, 1942 5 Sheets-Sheet 5
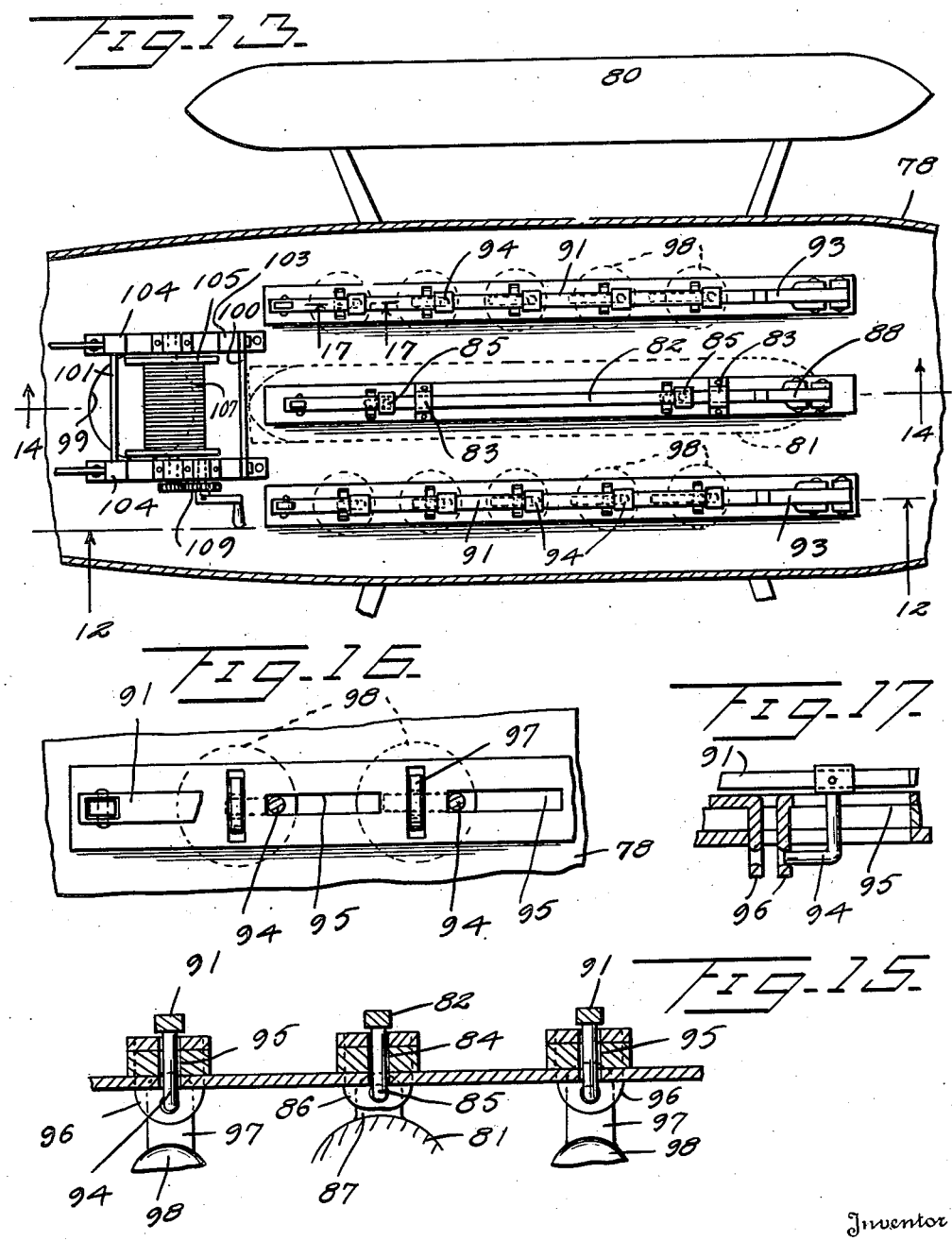

Patented Mar. 20, 1945

2,371,994

UNITED STATES PATENT OFFICE 2,371,994

BOMB RACK

Jakob Hojnowski, Nekoosa, Wis.

Application March 3, 1942, Serial No. 433,211

4 Claims. (Cl. 89—1.5)

This invention relates to certain new and useful improvements in bomb racks and bomb loaders for aircraft.

An object of the invention is to provide a bomb rack for aircraft with means to facilitate the loading of bombs on a rack within the aircraft.

A further object of the invention is to provide a bomb rack with bomb loading facilities for aircraft wherein the bomb rack is shiftable fore and aft of the fuselage of the aircraft to present bombs suspended by the rack in position for discharge from the aircraft.

It is a further object of the invention to provide a bomb rack for aircraft with independently operating dual supporting and retaining means for the bombs whereby upon operation of one of the dual supporting and retaining means which is successively disengaged from the bombs permits operation of the other dual supporting and retaining means for the discharge of the bombs from the aircraft.

A further object of the invention is to provide a cable-carried grappling hook supported upon a reel within the fuselage of an aircraft whereby the grappling hook may be extended from the aircraft for catching or grappling an enemy plane with a cushioned mounting for the reel carrying the grapple hook cable to relieve pulling strains on the aircraft carrying the grapple hook.

With the above and other objects in view that will become apparent as the nature of the invention is better understood, the same consists in the novel form, combination and arrangement of parts hereinafter more fully described, shown in the accompanying drawings and claimed.

In the accompanying drawings:

Figure 1 is a side elevational view, partly broken away and shown in section, of an aircraft equipped with a bomb rack and bomb loading mechanism, Figure 2 is a fragmentary top plan view, partly broken away, to show the bomb rack and the reel carried hoisting cable for loading the bombs on the rack, the reel being illustrated by dotted lines in a shifted position for the loading of a second row of bombs, Figure 3 is a vertical cross-sectional view taken on line 3—3 of Figure 1, showing the bomb-holding and release devices, one of which is illustrated by dotted lines in its bomb releasing position, Figure 4 is a detailed sectional view taken on line 4—4 of Figure 3, showing a part of the operating mechanism for shifting the bomb rack with the bomb loading cable reel carried by the rack, Figure 5 is a detailed sectional view taken on line 5—5 of Figure 4, showing the roller support and gear shifter for the bomb rack, Figure 6 is a detailed sectional view taken on line 6—6 of Figure 2, showing one of the bomb supporting and release devices, Figure 7 is a detailed sectional view taken on line 7—7 of Figure 1, showing the safety latch bar to prevent accidental release of the bombs from the rack, Figure 8 is a fragmentary side elevational view partly broken away and shown in section of an aircraft equipped with another form of bomb rack, Figure 9 is a vertical cross-sectional view taken on line 9—9 of Figure 8, showing a row of bombs supported centrally of the fuselage of the aircraft, Figure 10 is a fragmentary longitudinal sectional view of the bomb-holding and release devices shown in Figure 8, Figure 11 is a detailed sectional view taken on line 11—11 of Figure 10, Figure 12 is a side elevational view, partly broken away and shown in section, of a hydroplane equipped with racks for supporting a torpedo and a plurality of bombs and further equipped with a cable-carrying grapple hook and tensioned reel for the cable, and taken on line 12—12 of Figure 13, Figure 13 is a fragmentary horizontal sectional view taken on line 13—13 of Figure 12, Figure 14 is a longitudinal sectional view taken on line 14—14 of Figure 13, showing the release for the torpedo and the tensioned frame supporting the grapple hook cable drum, Figure 15 is a detailed cross-sectional view taken on line 15—15 of Figure 12, Figure 16 is a detailed sectional view taken on line 16—16 of Figure 12, and Figure 17 is a detailed sectional view taken on line 17—17 of Figure 13.

Referring more in detail to the accompanying drawings and particularly to Figures 1 to 7, the aircraft illustrated thereby which is in the form of an airplane comprises a fuselage 20 carrying lateral wings 21 equipped with propulsion motors 22. As shown in Figures 2 and 3 the bottom wall of the fuselage 20 is provided with a bomb discharge opening 23 that is normally closed by a slidably mounted overlying flexible door 24 guided in its movements at the opposite side longitudinal edges thereof by channel guides 25 mounted above the bottom wall of the fuselage.

A bomb rack is slidably mounted upon a track structure within the fuselage above the bomb discharge opening 23, the track structure comprising a pair of track rails 26 of I-beam construction respectively arranged at opposite sides of the opening 23. The bomb rack that is slidably mounted upon the track rails 26 as shown more clearly in Figures 1, 3 and 4 comprises a pair of spaced inverted V-shaped frames 27 associated with each track rail with the feet 28 and 29 of each frame interfittingly engaged with the head of the track rails as illustrated. The oppositely disposed forwardly and rearwardly positioned rack frames 27 are connected by cross beams 30 while a channel iron 31 arranged at each side of the bomb rack is anchored at its ends to the adjacent ends of cross beams 30 providing a rectangular head structure for the bomb rack as shown in Figure 2.

To longitudinally shift the bomb rack on the track rails 26, there is arranged at each side of the rack a rack bar 32 extending longitudinally of the fuselage parallel with and intermediate the track rails 26 and channel irons 31 to be engaged by pinions 33 fixed to the cross shaft 34 journaled at its ends in the forwardly positioned frames 27, one end of which shaft carries a hand wheel 35 for operation thereof. To hold the rack in its adjusted position, each foot 29 of the four frames 27 carries an anchor screw 36 for engagement with the track rails 26 as clearly shown in Figures 1, 2 and 4. To facilitate slidable adjustments of the bomb rack, each frame 27 carries supporting arms 37 upon which is journaled a wheel 38 riding on the adjacent track rail 26.

The bomb supporting elements and the retaining and release means for the bombs are provided in duplicate on the rack so that two parallel rows of bombs may be supported by the rack and each of the bomb supporting and control devices comprises a pair of parallel spaced outwardly opening channel irons 39 supported at their ends on the cross beams 30, the opposed upper sides of the channel irons 39 being concaved as at 40 to provide clearance for the bomb loading hooks engaged with the tails of the bombs, it being understood that these channel irons 31 are sufficiently spaced to permit passage therebetween of a bomb loading hook for the placement of a bomb in the rack.

To facilitate the loading of bombs on the rack, a shaft 41 is journaled transversely of the forward ends of the channel irons 31 and has a cable drum 42 splined thereon as at 43, each end of the shaft 41 carrying a crank handle 44. The drum 42 being splined to the shaft 41 is slidably keyed longitudinally thereof, and as shown by full and dotted lines in Figure 1, may be alined with each of the pairs of channel irons 39. The cable 45 from the drum 42 when spent from the drum passes over a pulley 46 supported by a hook 47 on the upper wall of the fuselage 20 in line with a pair of channel members 39, the free end of the cable carrying a hook 48 for engagement in the opening 49 in the tail 50 of the bomb 51, the hoisting cable and drum raising the bomb to place the tail 50 thereof forwardly between the channel members 39. The upper wall of the fuselage carries a series of spaced hooks 47 that overlie the position of support of the bombs on the rack so that when one bomb has been properly loaded the pulley 46 with its hanger is disengaged from the used hook 47 and engaged with a second hook for the loading of a second bomb, this arrangement being clearly disclosed in Figure 1 of the drawings. It will be understood that a row of spaced hooks 47 is disposed above each of the pairs of the channel members 39.

After the bombs have been place in position by the hoisting cable and drum, they are so retained by slidably mounted pins 52, one pin for each bomb, the pins 52 extending transversely of the rack and being slidably supported at their outer ends of the channel irons 31 of the rack, the inner end of each pin 52 being pointed as shown in Figure 6 to facilitate its entry into the second opening 53 in the tail 50 of the bomb. The outer end of each pin 52 outwardly of the adjacent channel iron 31 carries a pair of spaced lugs 54 between which a vertically disposed operating handle 55 is pivotally mounted as at 56, the upper end of the handle 55 being pivotally mounted as at 57 to an arm 58 carried by and outwardly offset from the channel iron 31. A bomb release handle 55 is provided for each bomb.

To restrain the bomb release handles from accidental operation means is provided at each side of the rack and such means includes a slide rod 59 supported at its ends in the frame structures 27 and disposed inwardly of the handles 55. A series of hooks 60 is carried by the outer side of each slide rod 59, the hooks being in position for engagement with the handles 55 and each hook of gradually increasing length in the direction toward the forward end of the rod so that upon initial sliding movement of the rod the rearmost hook will be disengaged from its restraining position relative to the handle 55, while a second movement of the rod will place the next hook thereon in its released position relative to its associated handle 55, this arrangement being clearly shown in Figures 1 and 7, each rod being slidably mounted through the medium of a hand lever 61 having a pin and slot connection as at 62 intermediate its ends with the forward end of the rod 59 while the lower end of the hand lever 61 is pivoted as at 63 to an arm 64 projecting forwardly of the front inverted V-shaped frame 27.

From the foregoing description it is believed that the construction of the devices illustrated in Figures 1 to 7 will be at once apparent, it being noted that after the bombs have been loaded on the rack by means of the cable and drum hoist and the retainer pins 52 are engaged in the openings 53 in the tails of the bomb, the hooks 60 carried by the slide rods 59 prevent accidental movement of the handles 55 that release the retainer pins 52 from the bombs. In the discharge of the bombs, the flexible door 24 is moved rearwardly of the opening 23 in the bottom of the fuselage and upon an initial movement of the slide rods 59 by means of the hand levers 61, the rearmost hooks 60 on said rods are disengaged from the handles 55 so that they may be manually operated as indicated by dotted lines in Figure 3 for the final release of the bomb. It will be understood that the rack is longitudinally adjustable relative to the fuselage and bottom discharge opening 23 for the correct positioning of the bombs to be released.

In the form of invention illustrated in Figures 8 to 11 a single centrally disposed longitudinally extending bomb supporting rack or bar is provided, the fuselage 65 being provided with a bomb discharge opening 66 in the bottom wall thereof that is closed by a slidably mounted flexible door 67 directly beneath the channel bar 69. A pair of spaced transversely extending channel bars 68 are secured to the upper wall of the fuselage for the support of an inverted U-shaped channel bar 69 extending longitudinally and centrally of the fuselage, opposite ends of the channel iron 69 being angularly directed upwardly to space the intermediate portion of the channel bar from the top wall of the fuselage as shown in Figure 8. As shown more clearly in Figures 10 and 11 a series of spaced inverted U-shaped bomb holders 70 is secured within the inverted channel iron 69 and the top wall of said channel iron is provided with a series of spaced longitudinally extending openings 71 with an opening adjacent each bomb holder 70. A holding and release rod 72 for the bombs is slidably mounted upon the upper side of the intermediate lower portion of the channel bar 69 and extends through the upwardly extending ends of said channel iron as shown in Figures 8 and 10. The slide rod 72 carries a series of depending angular bomb supporting hooks 73 extending downwardly through the openings 71 in the channel iron 69 for passage through openings in the bomb holders 70 and through openings in the tails of the bombs 74. The hooks 73 are of gradually increasing lengths in the forward direction of the rod 72 so that when said rod that is operated by the handle 75 pivoted at its upper end as at 76 to the top wall of the fuselage and having a pivotal connection 77 intermediate its ends with the forward end of the rod 72, the bombs 74 are sequentially released for discharge.

In the form of invention illustrated in Figures 12 to 17 the aircraft is of the hydroplane type, the fuselage 78 carrying frame bars 79 for the support of pontoons 80. In this form of invention provision is made in the bottom wall of the fuselage for the support of two rows of bombs and the intermediate support of a torpedo, the torpedo 81 and its supporting mechanism being shown more clearly in Figures 13 and 14. To support the torpedo 81 and to effect release thereof from its supported position, there is provided a slide rod 82 mounted in bearings 83 on the floor of the fuselage 78 and in which floor there is provided a pair of spaced openings 84 through which depend a pair of angular torpedo supporting hooks 85 that are adapted to pass through apertured lugs 86 to engage in an eye hook 87 positioned between said lugs. The slide rod 82 is shifted by means of the lever 88 pivoted to the floor of the fuselage as at 89 and also pivoted adjacent its lower end as at 90 to the forward end of the rod 82. It will be understood that when the lever 88 is operated the angle hooks 85 will be disengaged from the eye hooks 87 for the release of the torpedo 81.

In a like manner, two rows of spaced bombs are supported exteriorly of and beneath the fuselage 78, these rows being respectively at opposite sides of the supporting mechanism for the torpedo. For each row of laterally disposed bombs there is provided a slide rod 91 guided in bearings 92 with an operating lever 93 at the forward end thereof, each rod 91 carrying a series of depending angular hooks 94 respectively extending through spaced openings 95 in the floor of the fuselage, these angle hooks 94 extending through apertured lugs 96 for reception in eye hooks 97 carried by the bombs 98. The angle hooks 94 are of gradually increasing lengths in a forward direction so that when the rod 91 is operated by the lever 93 the bombs 98 are successively released for discharge.

A cable-carrying grapple hook and cable drum are supported within the fuselage 78 and this grapple hook is intended for release or projection from the fuselage for engagement with enemy aircraft and as shown in Figures 12 to 14 the bottom wall of the fuselage 20 rearwardly of the bomb and torpedo supports is provided with an opening 99 for the passage of a grapple hook and its carrying cable. The cable is wound upon the drum within the fuselage and the support for this drum comprises a pair of fixed brackets 100 and 101 adjacent the opening 99 and through which brackets a pair of laterally spaced fixed rods 102 extend. An inverted U-shaped frame comprising side legs 103 and 104 is slidably mounted upon the rods 102, the legs 103 and 104 being respectively positioned rearwardly of the fixed brackets 100 and 101 as clearly shown in Figures 12 and 14. The cable drum 105 is journaled on a shaft 106 in the legs 103 and 104, while the cable 107 spent therefrom carries a grapple hook 108 at its free end. The cable is rotated through the medium of a gear train and crank handle 109 shown more clearly in Figures 12 and 13. To relieve pulling strains and shocks on the aircraft equipped with the grapple hook, a coil spring 110 surrounds each rod 102 between the movable leg 103 of the drum supporting frame and the fixed bracket 101 as shown in Figure 14 and by this arrangement pulling strains and shocks of the aircraft are eliminated when the grapple hook 108 is engaged with an enemy plane as the frame structure comprised with the legs 103 and 104 together with the cable drum 105 can be moved against the tension of the compression spring 110.

While there are herein shown and described the preferred embodiments of the invention, it is nevertheless to be understood that minor changes may be made therein without departing from the spirit and scope of the invention as claimed.

I claim:

1. In aircraft of the character described, a fuselage, bomb supporting means associated with the fuselage, means operable at will for controlling the release of the bombs in succession, said means including a latch pin engageable with each bomb, a lever attached to each latch pin and adapted to be manually operated for disengaging the latch pin from the bomb, a rod slidably mounted to move transversely of the longitudinal axes of said levers and means on said sliding rod engageable with said levers for normally restraining movements of said levers, said last-named means being arranged in stepped formation to effect succession of release of said levers.

2. In aircraft of the character described, a fuselage, bomb supporting means associated with the fuselage, means operable at will for controlling the release of the bombs in succession, each bomb having an apertured tail, said means including a latch pin slidable transversely of the fuselage for passage through said apertured tail, an independent lever attached to each latch pin and adapted to be manually operated for disengaging the latch pin from the bomb, a slide rod, and hook-like elements on said slide rod engageable with said levers for restraining movement of said levers and arranged to be moved by sliding movement of said rod to release said levers so that said levers may be actuated to move the latch pins from engagement with the apertured tails of the bombs.

3. In aircraft of the character described, a fuselage, bomb supporting means associated with the fuselage, means operable at will for controlling the release of the bombs in succession, the bombs being alined in spaced relation, each bomb having an apertured tail, said means including a latch pin slidable transversely of the fuselage for passage through said apertured tail, an independent lever attached to each latch pin and adapted to be manually operated for disengaging the latch pin from the bomb, a slide rod, and hook-like elements on said slide rod engageable with said levers for restraining movement of said levers and arranged to be moved by sliding movement of said rod to release said levers so that said levers may be actuated to move the latch pins from engagement with the apertured tails of the bombs.

4. An aircraft of the character described, a fuselage, bomb supporting means associated with the fuselage, means operable at will for controlling the release of the bombs in succession, each bomb having an apertured tail, said means including a latch pin slidable transversely of the fuselage for passage through said apertured tail, an independent lever attached to each latch pin and adapted to be manually operated for disengaging the latch pin from the bomb, a slide rod, and hook-like elements on said slide rod engageable with said levers for restraining movement of said levers and arranged to be moved by sliding movement of said rod to release said levers so that said levers may be actuated to move the latch pins from engagement with the apertured tails of the bombs, and spaced channel iron guides between which the apertured tails of the bombs extend and having openings therein for the passage of the slidable latch pins.

JAKOB HOJNOWSKI.